United States Patent [19]
Kähny et al.

[11] Patent Number: 4,564,136
[45] Date of Patent: Jan. 14, 1986

[54] APPARATUS FOR THE AUTOMATIC SOLDERING-ON OF HARD METAL TEETH

[75] Inventors: Peter Kähny, Auenwald; Norbert Gerling, Aspach, both of Fed. Rep. of Germany

[73] Assignee: Kahny-Maschinenbau GmbH, Backnang-Steinbach, Fed. Rep. of Germany

[21] Appl. No.: 511,317

[22] Filed: Jul. 6, 1983

[51] Int. Cl.⁴ ............................................. B23K 13/00
[52] U.S. Cl. ........................................ 228/6.1; 228/33
[58] Field of Search .............. 228/6 R, 31, 33, 44.1 R, 228/49 R, 119, 139, 171, 33; 83/835; 76/112; 219/85 CA, 85 CM; 29/786, 787

[56] References Cited
U.S. PATENT DOCUMENTS

| | | | |
|---|---|---|---|
| 3,960,310 | 6/1976 | Nussbaum | 228/6 R |
| 4,061,057 | 12/1977 | Gray | 76/112 |
| 4,071,141 | 1/1978 | Gray | 76/112 |
| 4,110,591 | 8/1978 | Trinchera | 219/85 CA |
| 4,205,564 | 6/1980 | Kolb et al. | 76/112 |

Primary Examiner—Kenneth J. Ramsey
Assistant Examiner—M. Jordan

[57] ABSTRACT

The invention provides an apparatus for the automatic soldering of hard metal teeth onto the prongs of a circular saw blade, in which the feed of the hard metal teeth and of the solder platelets, coated with fluxing agent and respectively to be arranged between a hard metal tooth and the associated prong of the circular saw blade, is managed in a linear arrangement by a single transport equipment conveying each time only one hard metal tooth and one solder platelet. This transport equipment first picks up the solder platelet, moves this over a fluxing agent coating station, then by its gripper device seizes a singled hard metal tooth and moves both into a soldering mount tooth pick up position, where first the hard metal tooth is picked up by a soldering mount gripper tongs, which is rectilinearly displaceable perpendicularly to the movement direction of the transport equipment and which is then pushed forward so far that the solder platelet can be laid onto the upper side of the hard metal tooth. Thereafter, the soldering mount gripper tongs moves into the soldering position, in which a prong of the saw blade is pressed from above against the hard metal tooth and the soldering operation is performed through an inductive high frequency heating.

15 Claims, 7 Drawing Figures

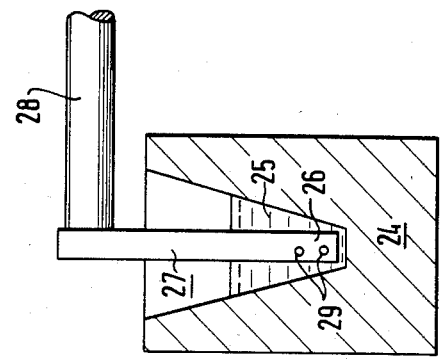
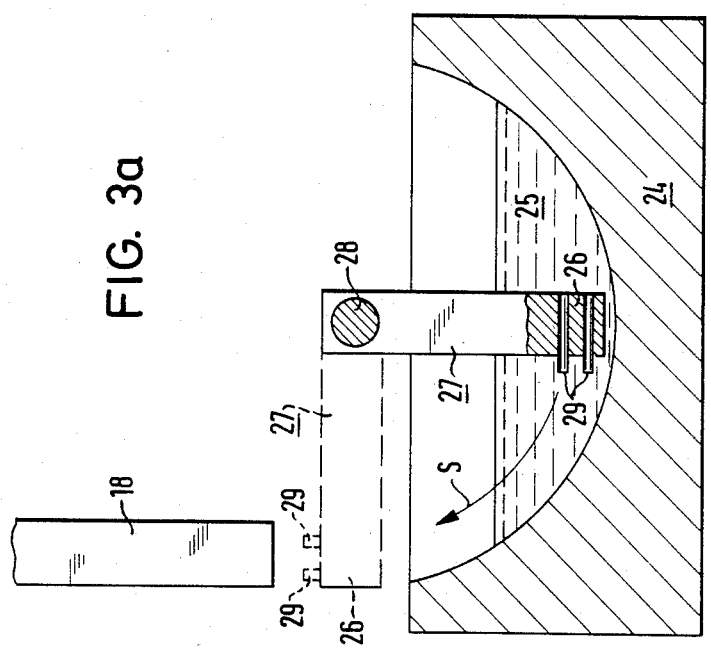

APPARATUS FOR THE AUTOMATIC SOLDERING-ON OF HARD METAL TEETH

FIELD OF THE INVENTION

The invention concerns an apparatus for the automatic soldering of hard metal teeth onto the prongs of a circular saw blade.

BACKGROUND OF THE INVENTION

A known apparatus of this kind displays its own turntable, in which eight gripper tongs are provided, and which is rotatable about a vertical axis in a circular arrangement so that said gripper tongs move through below a hard metal tooth feeding equipment which is arranged vertically above the plane of the gripper tongs and from which they each take over a respective hard metal tooth. Subsequently, each of the gripper tongs moves on its circular path to a fluxing agent feeding equipment, from which fluxing agent is dripped from above onto the upwardly facing soldering side of the hard metal tooth. Thereafter, each of the tongs gets into a position, in which a solder platelet, which for example consists of brass, is laid onto the upper side, coated with fluxing agent, of the hard metal tooth. In a further position, the unit respectively consisting of a hard metal tooth, dripped-on fluxing agent and a laid-on solder platelet is transferred from the gripper tongs transporting it to a soldering mount which moves it radially away from the turntable into a soldering position, in which it is pressed against a prong of the circular saw blade to be soldered.

This known apparatus is technically extra-ordinarily expensive by reason of the many gripper tongs which each pass through different working positions and must therefore be controlled independently one of the other. This is still increased through the employment of a turntable which must lie on an independent massive machine frame. The turntable possesses such a large diameter that an operating person standing on the one side of the circular saw blade to be soldered can not readily reach parts disposed on the other side of the installation, but must walk around the device complex for the elimination of disturbances possibly arising there.

An objective of the invention is to provide an apparatus of the initially named kind which is substantially smaller and more compact and thereby more easily operable with reduction of the required mechanical and control-technical effort.

SUMMARY OF THE MACHINE

The invention is based on the recognition that it leads to a substantially lower technical effort when, instead of the plurality of gripper tongs which in a common rotation move past several operating positions, one provides a single tooth transport equipment and a single solder platelet transport equipment which for each individual tooth and each individual solder platelet respectively move to and fro between a receiving position for the tooth or the solder platelet and a delivery position, wherein the solder platelet is laid onto the hard metal tooth only when this has already been transferred to the soldering mount. This arrangement becomes particularly simple when one combines both the transport equipments so that only a single carriage must be moved to and fro between the corresponding working positions. Although a series of operating steps following one upon the other in time must be passed through during the composition of the unit respectively to be soldered onto a prong of the circular saw blade and consisting of a hard metal tooth, a solder platelet and the fluxing agent disposed therebetween, the linear arrangement according to the invention is altogether more favourable than the turntable arrangement known from the state of the art and generally considered as ideal for operating cycles of that kind. The apparatus according to the invention can namely be built up not only substantially smaller and thereby operable more simply and with less technical effort, but it is beyond that in the special case of application readily able to perform at least the same number of solderings per unit time as the known turntable apparatus.

The time needed for a complete soldering operation is namely defined exclusively by the partial times which are required to transfer the hard metal tooth from the transport equipment to the soldering mount, to move the soldering mount into the soldering position, to produce the temperature required for the soldering and to let the soldering place again cool down so far that the contact pressure between saw blade prong edge and hard metal tooth can be taken away without the danger of a displacement or even dropping-off of the hard metal tooth existing. This time interval is about equally great in the known apparatus and in the apparatus according to the invention and fully sufficient for the transport equipments, which are moving to and fro in the apparatus according to the invention, for the hard metal tooth and the solder platelet to bring forward the parts needed for the respective next soldering operation so that the turntable arrangement, which is technically expensive and complicated to control and which runs through the individual operating positions far too quickly by comparison with the soldering operation, can be dispensed with.

A particularly advantageous development of the apparatus according to the invention is characterised thereby, that in it the fluxing agent is not dripped from above onto the soldering side of the hard metal tooth, which in the known apparatus occurs thereby, that the fluxing agent, which is liquid only at increased temperature, is constantly pumped around through a hose, which at one place, at which it extends away over the movement path of the gripper tongs, at its underside possesses a small opening, through which the fluxing agent is dripped onto the hard metal tooth respectively disposed therebelow. In that case, the danger exists that the drip opening clogs with rigidifying fluxing agent so that no further fluxing agent can be dripped onto the teeth, whereby the subsequently applied solder platelets can drop off so that no further solderings come into being.

Thereagainst, the fluxing agent in the arrangement according to the invention is kept liquid in a comparatively small, upwardly open basin. A stirrer arm, which is tiltable around a horizontal axis, dips by its front end into the fluxing agent and is so tilted upwardly when the solder platelet, which is sucked against the underside of a suction dye, is disposed above it that it wets the underside of the solder platelet with fluxing agent which has remained adhering in drop shape at its front end. A gluing-up or clogging of this device can no longer occur and it is secured with high reliability that a sufficient quantity of fluxing agent is present between each hard metal tooth and each solder platelet.

A particular advantage of the arrangement according to the invention is to be seen in that the units respectively consisting of a hard metal tooth, fluxing agent and solder platelet are not put together in a transport equipment as in the case of the state of the art and then transferred completely to the soldering mount, but that the composition of these units takes place in the soldering mount itself immediately before the actual soldering operation. Thereby, the danger that a solder platelet already applied to a hard metal tooth again drops down during the transport to the soldering place and thereby leads to a severe disturbance of the automatically devolving soldering operation is very strongly reduced in twofold manner, since for one thing the transfer of the hard metal tooth from the transport equipment to the soldering mount is completely uncritical in the apparatus according to the invention, because the solder platelet is laid onto the tooth only after this transfer, and because on the other hand the time interval, in which a laid-on solder platelet can fall down from the associated hard metal tooth, is reduced to an absolute minimum. Beyond that, a sensor, with the aid of which the presence of the solder platelet is checked, is according to the invention still arranged immediately in front of the soldering place so that a warning signal can be generated at once at the absence of a solder platelet.

BRIEF DESCRIPTION OF THE DRAWING

The invention is described in the following with the aid of an example of embodiment with reference to the drawing; in this, there show.

DESCRIPTION OF A PREFERRED EMBODIMENT OF THE INVENTION

The apparatus according to the invention is so built up that it needs no own machine table. Rather, it can be fastened, as the figures show, with the aid of mounting plates 2 and 3 directly to the high frequency generator 1 required in any case for the generation of the high soldering temperatures.

Figure 1:
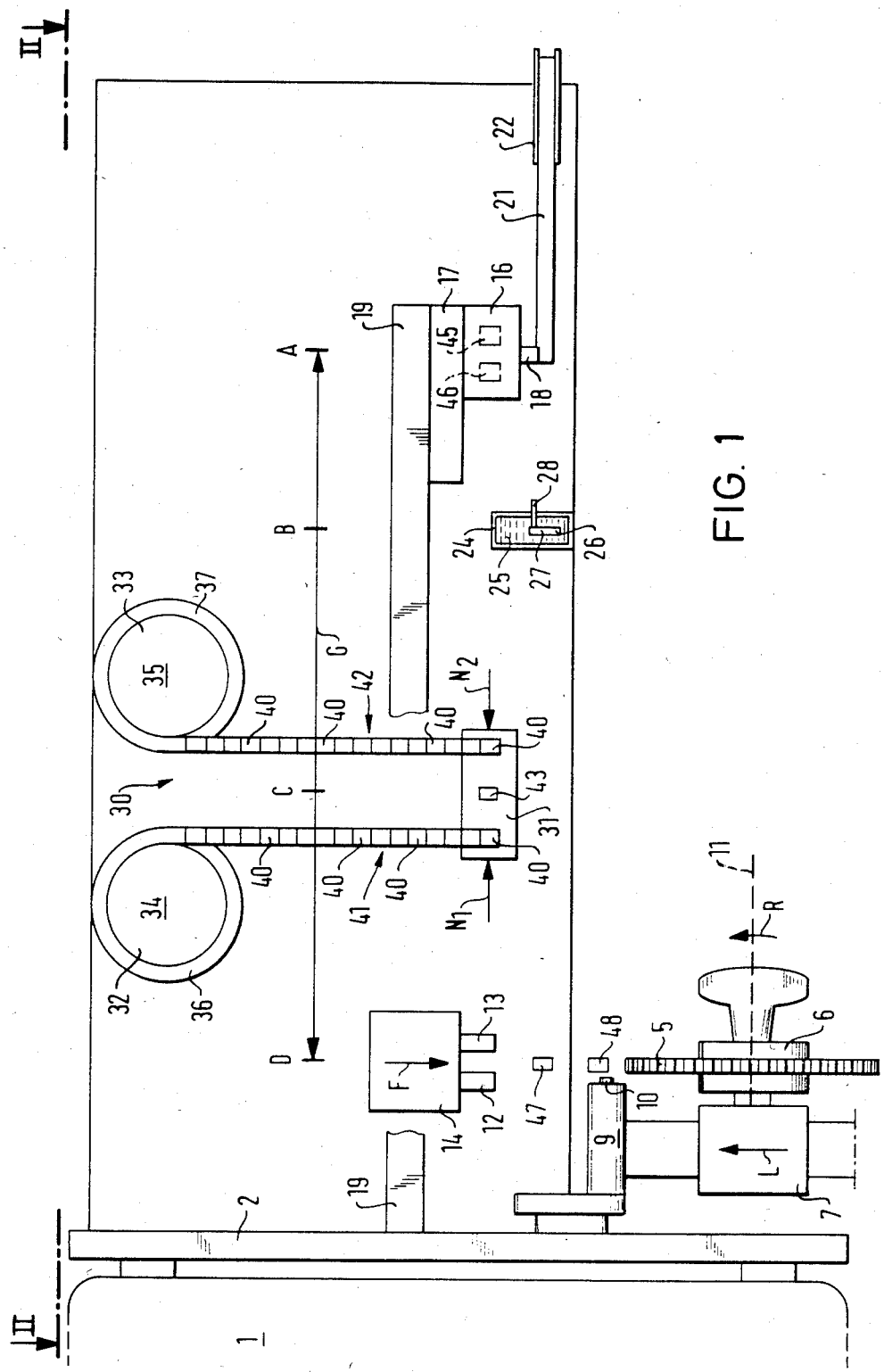
FIG. 1 a schematic plan view onto an apparatus according to the invention.

Illustrated at the bottom left in FIG. 1 is the saw blade 5, which is clamped in a snap closure 6, which in its turn is fastened to a carriage 7, with the aid of which the saw blade 5 can be driven in direction of the arrow L into the soldering position, in which the driving equipment 9 by its roller 10 lies against the side surface of the saw blade 5 in order to drive this around its axis 11 illustrated in dashed lines in FIG. 1. In this manner, the individual prongs of the saw blade 5 can be brought in turn into the soldering position and the respective prong can be pressed from above against the hard metal tooth which is to be soldered on and which at this instant is held by the cheeks 12 and 13 of the gripping tongs 14 serving as soldering mount. In that case, other than illustrated in FIG. 1, the gripper tongs 14 is displaced with the aid of the carriage device 14, represented only in FIG. 2, so far in direction of the arrow F (FIG. 1) towards the saw blade 5 that the prong, intended for the next soldering operation, of the saw blade 5 can be pressed by the drive device 9 from above against the hard metal tooth held by the gripper tongs 14, a solder platelet and fluxing agent being disposed between this tooth and the prong of the saw blade 5.

In FIG. 1, the gripper tongs 14 is illustrated in its position furthest removed from the soldering position, i.e. in its tooth pick up position, in which it can take over a hard metal tooth brought forward by a second gripper tongs 16 serving as tooth transport equipment, when the tooth transport equipment is disposed above the soldering mount being in its tooth pick up position D. (See also FIG. 2d).

As illustrated schematically in FIG. 1, the tooth transport gripper tongs 16 is fastened to a carriage 17, with the aid of which it can be pushed to and fro between the positions A and D in direction of the double arrow G along the carrier plate 19 and perpendicularly to the movement direction of the soldering mount gripper tongs 14.

In FIG. 1, the carriage 17 is disposed in the end position A, which is furthest removed from the soldering mount tooth pick up position D and in which the tooth transport gripper tongs 16 exercises no function. This end position A is of importance rather for a solder platelet transport equipment 18, which is fastened at the side of the gripper tongs 16 remote from the carriage 17 and which, as illustrated schematically in the FIGS. 2a to 2d, is constructed as suction dye, with the aid of which a solder platelet can be sucked on and retained, which as indicated schematically in FIG. 2a had been severed with the aid of a knife 20, which is movable in direction of the arrow H, from a tape 21, which is drawn off intermittently in direction of the arrow K from a coil 22 by a not illustrated device.

Figure 2A:
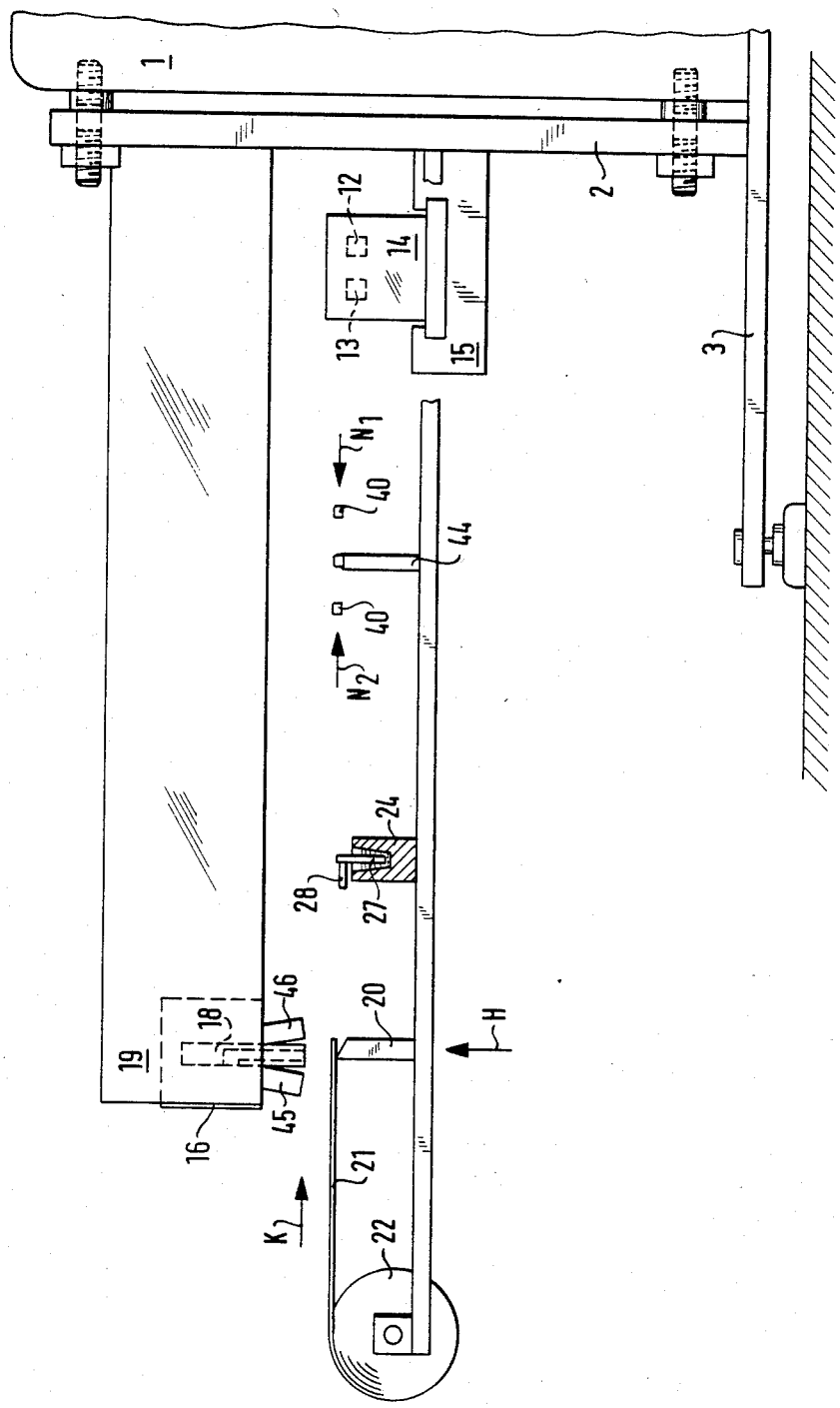
FIGS. 2a to 2d side elevations of the apparatus of FIG. 1 in direction of the arrows II—II, wherein the combined tooth and solder platelet transport equipment is disposed each time in a respective one of the positions designated by A to D in FIG. 1, and FIG. 3a and 3b a schematic side and a schematic front elevation of an apparatus according to the invention for the application of fluxing agent onto the underside of a solder platelet.
Figure 2B:
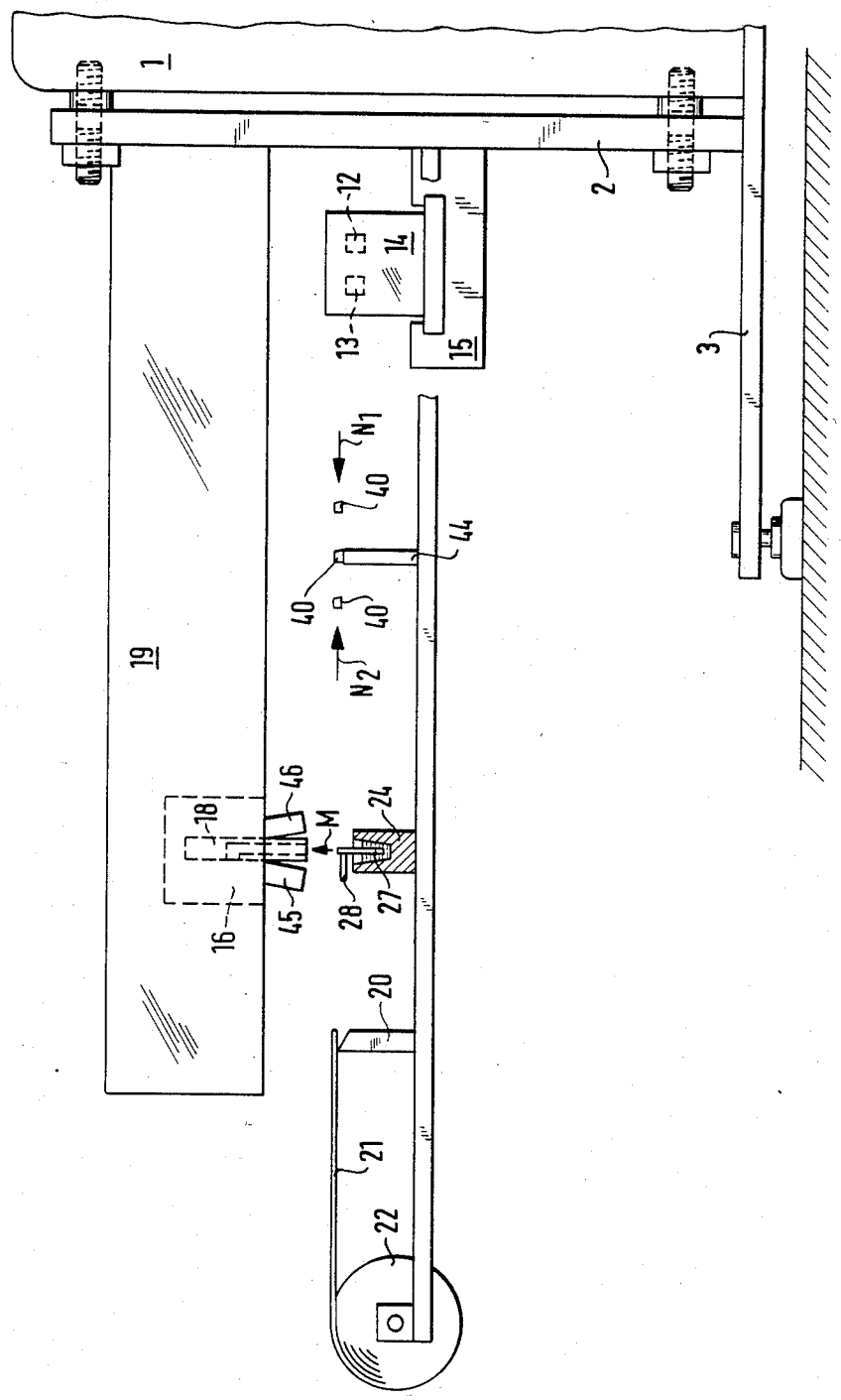

If this has taken place in the solder platelet pick up position A, then the carriage 17 moves into the intermediate position B, in which the solder platelet transport equipment 18 is disposed above a container 24 for fluxing agent 25. An arm 27 dips by its front end 26 into the fluxing agent 25 disposed in the container 24 and can be so pivoted by means of a horizontal shaft 28 that its front end 26 moves upwardly out of the fluxing agent 25 as is indicated in FIG. 2b by the arrow M. In that case, the front end 26 of the arm 27 touches the underside of the solder platelet held by the suction dye 18 and wets the solder platelet with fluxing agent which the arm 27 by reason of the special formation, according to the invention, of its front end 26 has entrained upwardly.

This is illustrated more exactly in the FIGS. 3a and 3b. The sectional side elevation, seen according to FIG. 1 from the right, of the FIG. 3a shows that the interior space of the container 24 in this direction has a part-circular cross-section, the centre of which co-incides with the axis of rotation of the shaft 28. Thereby, the arm 27 reaching by its front end 26 nearly to the bottom of the container 24 can be raised through a rotation of the shaft 28 in direction of the arrow S into the position, which is illustrated by dashed lines in FIG. 3a, whilst it wipes almost along the bottom wall of the container. This is important because a constant, uniform intermixing of the fluxing agent 25 is attained hereby and the formation of dead zones is prevented, in which it could come to a solidification of the fluxing agent. It is evident from the front elevation of the FIG. 3b that the interior space of the container displays an about V-shaped cross-section in this direction, which likewise prevents the formation of dead zones in the fluxing agent 25.

Two pins 29, which in the raised position of the FIG. 3a protrude upwardly beyond the surface of the arm 27, are pressed into the front end 26 of arm 27 and according to the invention have the effect that the arm 27 during its lifting movement entrains upwardly a drop of the fluxing agent, which is sufficiently large in order in the required manner to wet the solder platelet, which is held by the suction dye 18 and not illustrated in FIG. 3a, at its underside. Both the pins 29 are spaced one from the other somewhat less far in longitudinal direction of the arm 27 than a solder platelet held by the suction dye 18 is long in this direction.

After the solder platelet has been wetted by fluxing agent on its underside, the carriage 17 moves further into a second intermediate position C in which the tooth transport gripper tongs 16 is disposed above a singling equipment 31 forming the end of a hard metal tooth feeding equipment 30.

As is evident from the FIG. 1, the hard metal tooth feeding equipment 30 comprises two orienting devices 32 and 33, in which lefthand and righthand hard metal teeth are filled in from above into respective upwardly open containers 34 and 35 possessing a circularly cylindrical cross-section. In an in itself known manner, these orienting devices 32 and 33 perform a vibratory movement which causes the hard metal teeth lying on the bottom of the container 34 and 35, respectively, to wander along an upwardly rising spiral track 36 and 37, respectively, mounted at the inside wall of the container. Not illustrated deflecting devices and obstacles are arranged in suitable manner along these spiral tracks and either turn into the correct position or throw back into the containers 34 and 35, respectively, all those teeth, the position or orientation of which differs from a predetermined target position. This has the consequence that lefthand and righthand hard metal teeth continuously, i.e. closely adjoining one against the other, issue at the upper end of the respective spiral track 36 or 37 in an orientation as required afterwards for the soldering-on of the respective hard metal tooth to the saw blade 5.

Hard metal teeth 40 issuing at the upper end of the spiral tracks 36 and 37 are fed with the aid of rectilinear guide tracks 41 and 42 to the singling device 31, which displays a not illustrated slide, the function of which is illustrated schematically by both the arrows $N_1$ and $N_2$.

As the arrows $N_1$ and $N_2$ indicate, the slide can be displaced into a lefthand or first and a righthand or second end position in FIG. 1, in which it takes over the frontmost hard metal tooth 40 disposed in the guide track 41 or 42 and conveys it into a mid-position indicated by the rectangle 43 in FIG. 1.

Figure 2C:
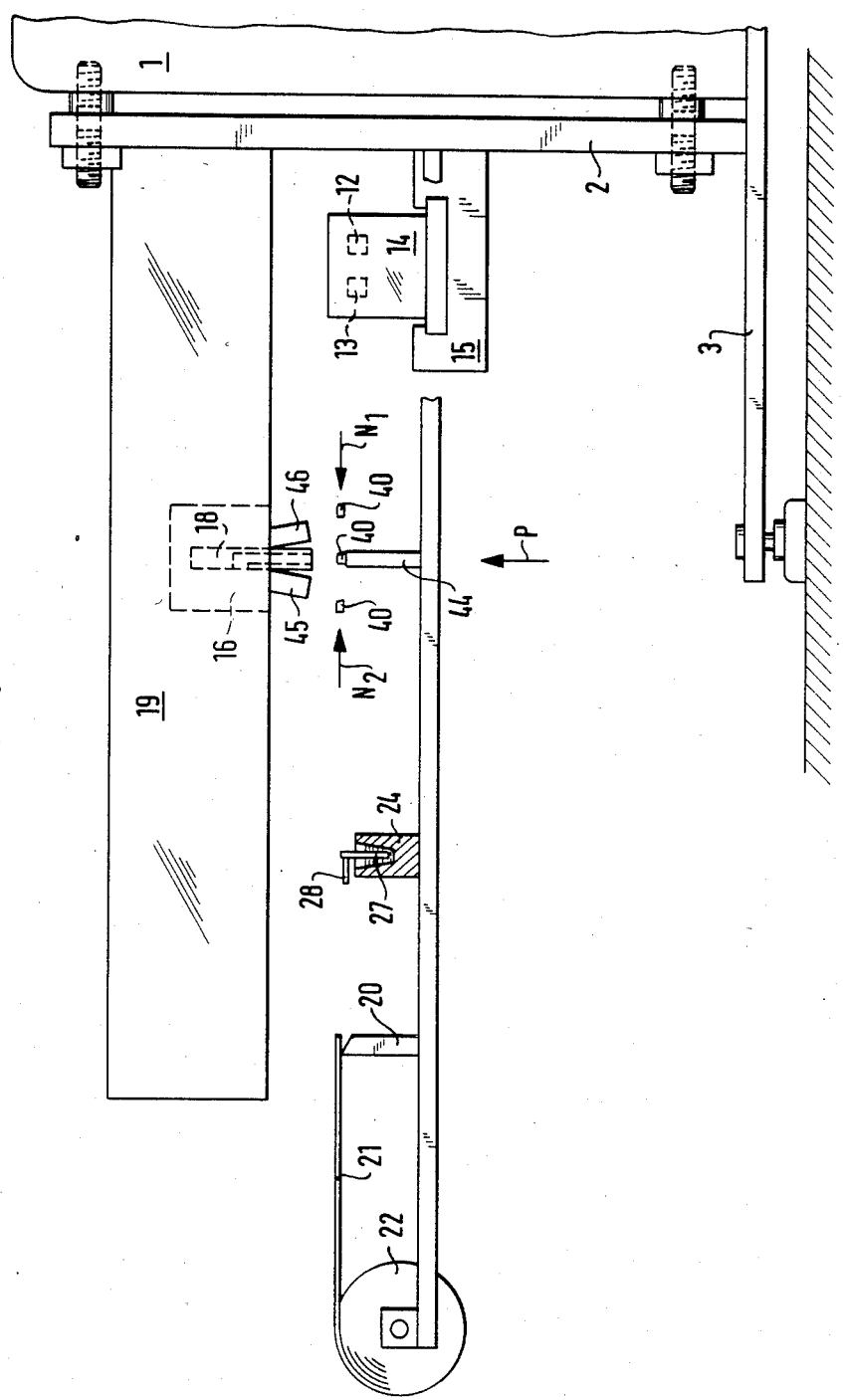
Figure 2D:
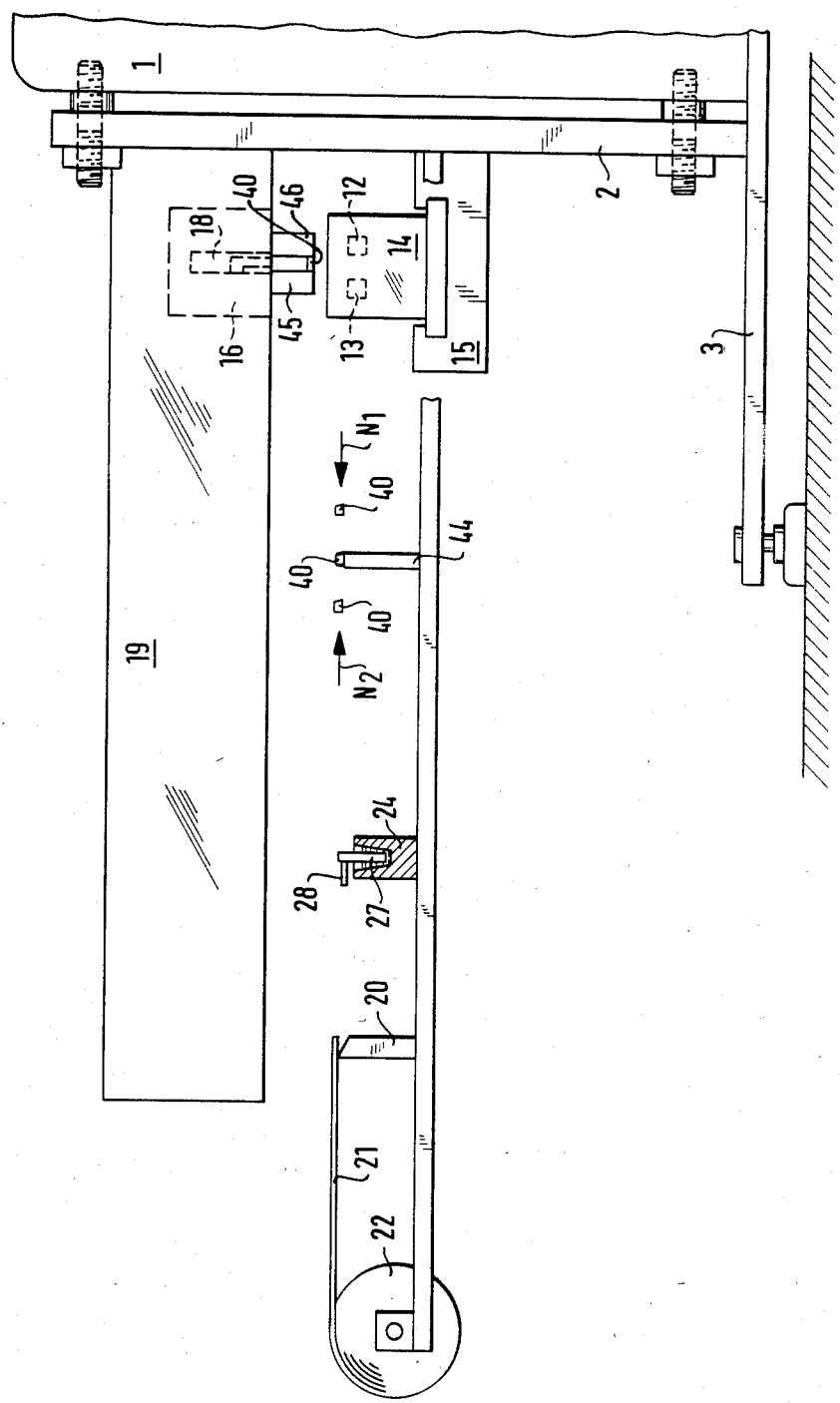

When a hard metal tooth 40 has reached this mid-position 43, then a die 44 moves upwardly, as indicated in FIG. 2c by the arrow P, and raises the hard metal tooth 40 so far that it can be seized by the up until then opened gripping cheeks 45 and 46 of the tooth transport gripper tongs 16.

When this has occurred, then the carriage 17 moves into the soldering mount tooth pick up position D, in which the hard metal tooth 40 is so disposed above the gripping cheeks 12 and 13 of the soldering mount gripper tongs 14 fully retracted into its take-over position that it can be taken over by this. When this has occurred, the soldering mount gripper tongs 14 moves so far forwardly in direction of the arrow F in FIG. 1 that the hard metal tooth 40 assumes the position, which is represented by the rectangle 47 and in which it is disposed exactly below the suction die 18.

At this instant, the partial vacuum, which has retained the solder platelet at the underside of the suction die 18, is taken away so that the solder platelet is deposited onto the upper side of the hard metal tooth disposed in the position 47. Since the underside of the solder platelet was coated by fluxing agent in the intermediate position B, the fluxing agent is now disposed between the upper side of the hard metal tooth 40 and the underside of the solder platelet laid on.

Thereafter, the soldering mount gripper tongs 14, as was already described above, can advance into its soldering position, for which it is checked by the detector 48 whether a solder platelet is actually disposed on the hard metal tooth. During the now following soldering operation, the combined hard metal tooth and solder platelet transport equipment 16, 17 and 18 can already be moved back again into the solder platelet pick up position A and pass through the next operating cycle.

Since the soldering operation, which is performed with the aid of an inductive high frequency heating apparatus, inclusive of heating-up and cooling-down demands several seconds, there is sufficient time to let the hard metal tooth and solder platelet transport unit 16, 17 and 18 get simultaneously with the soldering mount gripper tongs 14 into the soldering mount tooth pick up position D. Since the soldering mount gripper tongs 14 can move very rapidly to and fro between both its end positions, the overall length of a complete operating cycle is determined substantially by the length of the soldering operation itself.

We claim:

1. Apparatus for the automatic soldering of hard metal teeth onto the prongs of a circular saw blade, wherein said apparatus comprises a soldering mount being movable to and fro between a soldering mount tooth pick up position and a soldering position in which a hard metal tooth, on the top of which a solder platelet is placed having a drop of a flux on its bottom side, is held and pressed by said soldering mount from below against a prong of the circular saw blade during the heating-up, soldering and cooling-down operations, a tooth transport means being movable to and fro between a tooth feeding means placing ready individual hard metal teeth with a defined orientation and said soldering mount tooth pick up position, said tooth transport means being adapted at each to and fro going stroke of its movement to pick up one individual hard metal tooth from said tooth feeding means, to transport said individual hard metal tooth and to transfer it to said soldering mount at said soldering mount tooth pick up position, a solder platelet transport means being movable to and fro between a solder platelet pick up position and a solder platelet deposition position which is arranged on the movement path of said soldering mount, said solder platelet transport means being adapted at each to and fro going stroke to pick up one individual solder platelet at said solder platelet pick up position, to transport said individual solder platelet to said solder platelet deposition position and to place said solder platelet at said deposition position on the top of a hard metal tooth being held by said soldering mount, and a flux feeding means being adapted for placing a drop of the flux on the bottom side of each solder platelet.

2. An apparatus as claimed in claim 1, wherein said solder platelet transport means is movable to and fro along a horizontal path and has a suction means for picking up and retaining said individual solder platelets.

3. An apparatus as claimed in claim 2, wherein said flux feeding means is along the path of said solder platelet transport means and has an arm for wetting each individual solder platelet with flux from below.

4. An apparatus as claimed in claim 1, wherein said tooth feeding means comprises a tooth singling equipment and wherein said tooth transport means comprises a gripper tongs for picking up one individual hard metal tooth from said tooth singling equipment at each to and fro going stroke of said tooth transport means.

5. An apparatus as claimed in claim 4, wherein said tooth singling equipment comprises
- a slide being movable to and fro between a first and a second end position,
- a first orienting device for orienting "lefthand" hard metal teeth and for feeding them one at a time to said slide when it is in its first end position,
- a second orienting device for orienting "righthand" hard metal teeth and for feeding them one at a time to said slide when it is in its second end position, said slide going through a mid-position during each stroke of its to and fro going movement, in which mid-position the respective hard metal tooth contained in the slide is fed to said gripper tongs of said tooth transport means.

6. An apparatus as claimed in claim 5, wherein the movement path of said slide is arranged below the movement path of said gripper tongs and wherein said tooth singling means further comprises a push rod for raising a hard metal tooth disposed in said slide when the slide is in its midposition.

7. An apparatus as claimed in claim 1, wherein said tooth transport means and said solder platelet transport means are arranged on a common carriage being movable to and fro between two end positions in the one of which said solder platelet transport means is in its solder platelet pick up position and in the other one of which the solder platelet transport means is in its solder platelet deposition position and in which said tooth transport means simultaneously is above said soldering mount tooth pick up position.

8. An apparatus as claimed in claim 7, wherein between the two end positions of said carriage two intermediate positions for said carriage are provided in the first of which flux is applied to said solder platelet and in the second of which said tooth transport means picks up individual hard metal teeth from said tooth feeding means.

9. An apparatus as claimed in any of claims 1 to 8, wherein said soldering mount is constructed as water-cooled gripper tongs.

10. An apparatus as claimed in claim 1, wherein a sensor, monitoring the resting of the solder platelet on the hard metal tooth, is arranged immediately before the soldering position at the movement path of the soldering mount.

11. An apparatus as claimed in claim 3, wherein said flux feeding means comprises an upwardly open container for the flux, the interior space of said container having a part-circular cross-section in a vertical plane, and wherein said arm is rotatable about a horizontal shaft which is so arranged above said container that its axis of rotation extends through the center of said partial circle.

12. An apparatus as claimed in claim 11, wherein said arm by its front end reaches nearly to the bottom of said container.

13. An apparatus as claimed in claims 11 or 12, wherein the interior space of said container has an about V-shaped cross-section in a vertical plane perpendicular to the plane of movement of said arm.

14. An apparatus as claimed in claim 11, wherein the front end of said arm is provided with two protrusions which are spaced one from the other in longitudinal direction of said arm and which, in the raised position of said arm, protrude upwardly beyond its upper side.

15. An apparatus as claimed in claim 14, wherein said protrusions are formed by two pins pressed into corresponding bores of said arm.

* * * * *